A. JAS.
ICE-MACHINE.
No. 177,845. Patented May 23, 1876.
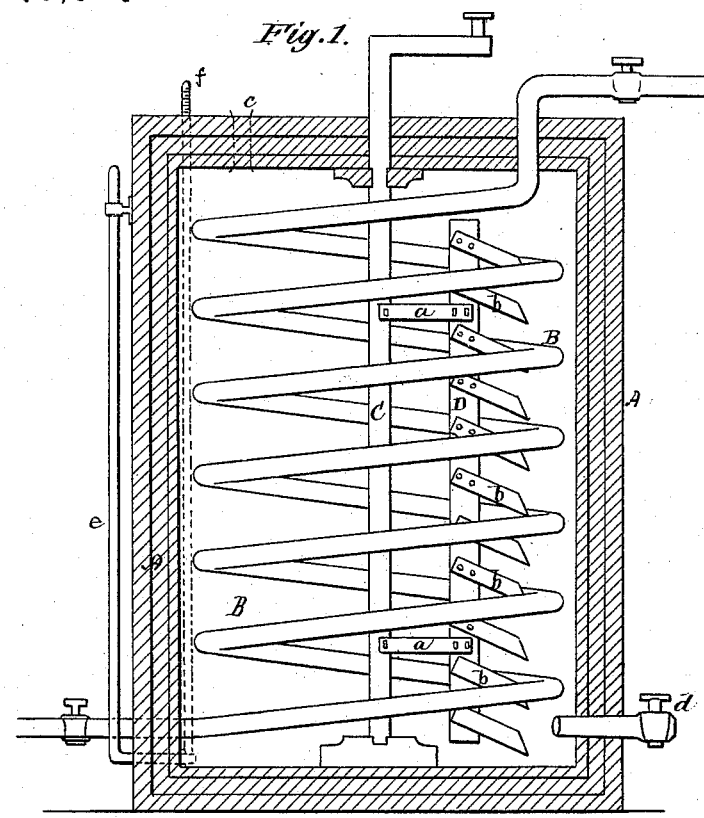
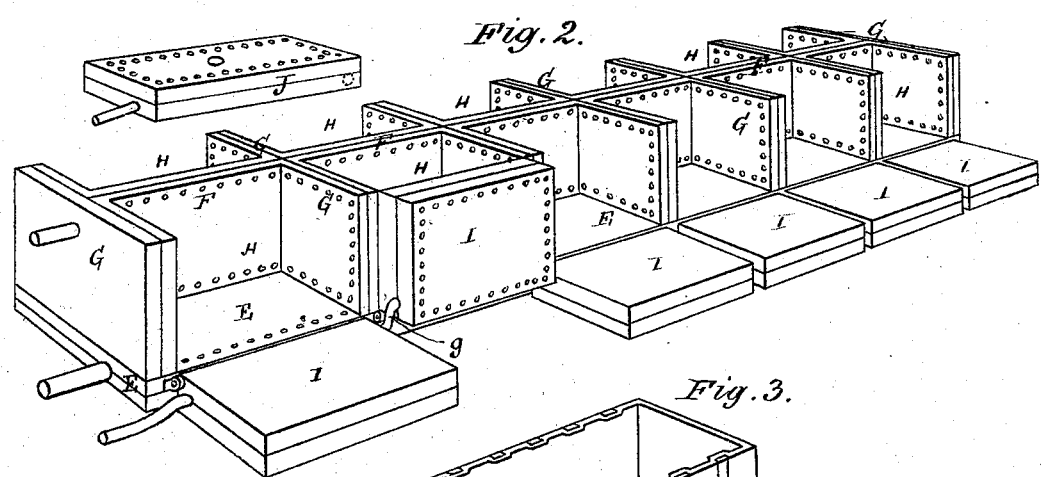
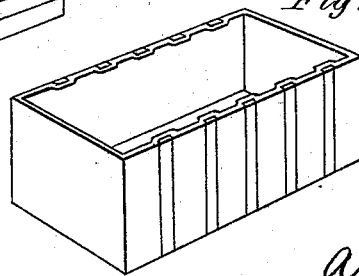
Witnesses
Inventor:
August Jas

UNITED STATES PATENT OFFICE.

AUGUSTE JAS, OF NEW ORLEANS, LOUISIANA, ASSIGNOR OF ONE-HALF HIS RIGHT TO ALBERT C. JANIN, OF SAME PLACE.

IMPROVEMENT IN ICE-MACHINES.

Specification forming part of Letters Patent No. 177,845, dated May 23, 1876; application filed April 27, 1876.

*To all whom it may concern:*

Be it known that I, AUGUSTE JAS, of the city of New Orleans and State of Louisiana, have invented certain new and useful Improvements in Ice-Machines, of which the following is a specification:

My improvements relate partly to apparatus for depriving water of air, preliminarily to converting said water into ice, and partly to the freezing apparatus or congealer.

The first part of my invention is based on the property which water possesses of condensing by the application of cold up to $+4°$ centigrade, at which point it reaches its maximum density, and of freeing itself by reason of this increased density of the air which it may hold in suspension, especially if at the same time a slight movement is imparted to the water not sufficient to ruffle or disturb its surface.

The apparatus I employ for the purpose is shown in vertical section in Fig. 1 of the accompanying drawings.

A is a cylinder or vessel designed to contain the water to be converted into ice.

An ordinary tubular coil, B, of a diameter a little less than the vessel, is located in the water. Through this coil passes the refrigerating-agent, which is in communication with the refrigerant reservoir in the same manner as is the congealer or freezing apparatus.

After producing the required effect, the refrigerant passes through the return-coil shown in my Letters Patent No. 168,501, of October 5, 1875, and follows the ordinary current in ice-machines.

In the center of the vessel is a vertical arbor, C, stepped in the bottom of the vessel, and carrying a plate, D, parallel with it, and attached to it by jointed arms $a$, which permit the plate to be adjusted nearer to or farther away from the coil, as desired. The plate D is the device which imparts to the water the slight movement hereinbefore mentioned. It may be of any suitable form, preferably, a flat plate set at an angle to its supporting-arm, so as to force the water against the coil. To this plate may be attached small projecting arms $b$, preferably set at an angle, as shown—an arrangement which is very effective in mingling the different vertical and horizontal layers of water, and in bringing each molecule in its turn into direct contact with the coil. This agitator is put in motion by any suitable power. The apparatus thus organized is placed at a higher level than the top of the congealer.

The vessel A, which is a closed vessel, is filled through an opening, $c$. The water, cooled nearly to the freezing-point, is drawn off from the vessel through a cock, $d$, and is led through rubber tubing to the several molds of the congealer. Stop-cocks are also provided at the points where the refrigerant enters and leaves the apparatus. A graduated water-level, $e$, is provided on the exterior of the vessel, and it is also desirable to use a thermometer, $f$, to determine the temperature.

The operation is as follows: The vessel being filled with water, the gas is allowed to enter and circulate through the coil at the same time that the agitator is put in motion. When the thermometer indicates that the water is nearly at the freezing-point, it is drawn off through the rubber tubing connected with the cock $d$, and distributed to the several molds. In order to accelerate the operation the vessel can be supplied with water from the cooling-tank shown in my Letters Patent No. 168,501. By this means I obtain transparent ice without having recourse to condensation by steam or heat; and this preliminary preparation of the water has the further advantage of facilitating and accelerating the freezing operation.

Fig. 2 represents, in perspective, a congealer or freezing apparatus embodying the improved features which constitute the second part of my invention. Fig. 3 is a perspective view of one of the molds.

The congealer is made up as shown of a series of cells.

E is the hollow base, which is provided internally with partitions, preferably arranged to cause the refrigerant agent to travel in a serpentine path, from end to end of the base. Upon the base is erected a longitudinal partition-wall, F, and also transverse partition-walls G, thus forming on the base a series of cells or boxes, H, each of which is closed on the outside by a hinged door or plate, I, turning on horizontal hinges. The longitudinal partitions F and cross-partitions G are hollow, and formed like the base. The hollow wall F is supplied with the refrigerant independently of the base. The cross-partitions G may be in communication with either the base or the longitudinal partition-wall, or they may receive their own supply of the refrigerant. The series of hinged doors, made hollow and like the base E, internally receive an independent supply of the refrigerant. The doors on each side are connected one with the other by flexible tubing $g$, which will permit the refrigerant to pass from one to the other, while allowing each door to be opened or shut at will. A cover, J, may be provided for each cell, or there may be one cover for all the cells. The cover is made substantially like the base, and receives its own supply of the refrigerant.

The mold shown in Fig. 3 is two and a half feet long, one foot deep, and one foot wide. It will contain a block of ice weighing about one hundred and fifty pounds. The mold is inserted into its cell through the open side of the cell, and the door is then closed, thus sealing the mold in its cell, and surrounding it with a refrigerating-surface, with which it is in contact. The interior of the cell is preferably lined with a fabric impregnated with a non-congealable liquid.

The molds may be filled with water before or after they are put in their cells. It is preferable to fill them in their cells, and for this purpose the water may be supplied to them through apertures formed in the cover or covers, or in the upper part of the doors.

The congealer may be of any number of cells desired—one or more. The hinged door facilitates greatly the manipulation of the molds. The walls, base, and cover may be of any suitable or usual internal construction to afford passage for the refrigerant agent; and the refrigerant may be supplied thereto in any suitable or desired manner.

What I claim, and desire to secure by Letters Patent, is—

1. The method described of condensing water and depriving it of air by subjecting it to the action of a cooling-agent, and at the same time gently agitating it in such a manner as to bring all its parts in contact with the cooling-agent, substantially as set forth.

2. The water-condensing apparatus, consisting of the closed vessel, in combination with the cooling-coil and the agitator, arranged and operating substantially as set forth.

3. The described congealer, formed of one or more cells, each provided with a horizontally-hinged door, having flexible tubing for the entrance and discharge of the refrigerant, substantially as set forth.

In testimony whereof I have hereunto signed my name this 10th day of April, A. D. 1876.

AUGUSTE JAS.

Witnesses:
E. FIXARY,
A. ABAT.